US012598164B2

(12) United States Patent
Kim et al.

(10) Patent No.: US 12,598,164 B2
(45) Date of Patent: Apr. 7, 2026

(54) SYSTEM AND METHOD FOR ENCRYPTING AND DECRYPTING DATA

(71) Applicant: ICERTI CO., LTD, Daejeon (KR)

(72) Inventors: Young Hu Kim, Seoul (KR); Nam Kyu Kim, Seoul (KR); Yong Man Jeong, Seoul (KR); Hyun Su Kim, Seoul (KR); Hyun Gi Kim, Seoul (KR)

(73) Assignee: ICERTI CO., LTD, Daejeon (KR)

( * ) Notice: Subject to any disclaimer, the term of this patent is extended or adjusted under 35 U.S.C. 154(b) by 192 days.

(21) Appl. No.: 18/575,765

(22) PCT Filed: Oct. 31, 2022

(86) PCT No.: PCT/KR2022/016831
§ 371 (c)(1),
(2) Date: Dec. 29, 2023

(87) PCT Pub. No.: WO2023/191216
PCT Pub. Date: Oct. 5, 2023

(65) Prior Publication Data
US 2025/0080509 A1      Mar. 6, 2025

(30) Foreign Application Priority Data
Mar. 28, 2022     (KR) ........................ 10-2022-0038231

(51) Int. Cl.
*H04L 9/40* (2022.01)
*H04L 9/08* (2006.01)
(52) U.S. Cl.
CPC ........ *H04L 63/0428* (2013.01); *H04L 9/0861* (2013.01)

(58) Field of Classification Search
CPC .......................... H04L 63/0428; H04L 9/0861
(Continued)

(56) References Cited

U.S. PATENT DOCUMENTS 7,363,500 B2 *  4/2008  Funk ................... H04L 63/1466
                                                        713/180
8,099,599 B2 *  1/2012  Folta ...................... H04L 9/065
                                                        713/160
(Continued)

FOREIGN PATENT DOCUMENTS

KR             97-25163 A       5/1997
KR     10-2008-0046515 A       5/2008
(Continued)

OTHER PUBLICATIONS

International Search Report for PCT/KR2022/016831 by Korean Intellectual Property Office dated Feb. 10, 2023.

*Primary Examiner* — Dant B Shaifer Harriman
(74) *Attorney, Agent, or Firm* — BROADVIEW IP LAW, PC

(57)                    ABSTRACT

A method of encrypting data, performed by a computer system includes: dividing transmission target data into an arbitrary number of blocks; selecting an encryption key generation target block to be used for extracting an encryption key from among the plurality of divided blocks; generating an encryption key based on the encryption key generation target block; selecting an encryption target block from among remaining blocks excluding the encryption key generation target block; and encrypting the encryption target block based on the generated encryption key.

15 Claims, 6 Drawing Sheets

(58) Field of Classification Search
USPC ........................................................ 713/160
See application file for complete search history.

(56)                         References Cited

U.S. PATENT DOCUMENTS

| | | | | | |
|---|---|---|---|---|---|
| 8,155,311 | B2 * | 4/2012 | Shin | ...................... | H04L 9/0637 |
| | | | | | 380/46 |
| 8,281,128 | B2 * | 10/2012 | Lee | ...................... | H04N 7/1675 |
| | | | | | 380/42 |
| 8,584,228 | B1 * | 11/2013 | Brandwine | ............. | H04L 61/45 |
| | | | | | 713/160 |
| 9,602,278 | B2 * | 3/2017 | Furukawa | ............. | H04L 9/0861 |
| 2006/0034453 | A1 * | 2/2006 | Liu | ...................... | H04L 9/3236 |
| | | | | | 380/28 |
| 2007/0297410 | A1 * | 12/2007 | Yoon | ...................... | H04L 67/14 |
| | | | | | 370/392 |
| 2023/0179409 | A1 * | 6/2023 | Camenisch | ........... | H04L 9/0819 |
| | | | | | 713/171 |

FOREIGN PATENT DOCUMENTS

| | | | |
|---|---|---|---|
| KR | 10-2011-0087094 | A | 8/2011 |
| KR | 10-2017-0100133 | A | 9/2017 |
| KR | 10-2018-0105545 | A | 9/2018 |
| KR | 10-2018-0129147 | A | 12/2018 |

* cited by examiner

FIG. 1

SYSTEM AND METHOD FOR ENCRYPTING AND DECRYPTING DATA

CROSS-REFERENCE TO RELATED APPLICATIONS

This application is a National Phase Entry Application of PCT Application No. PCT/KR2022/016831 filed on Oct. 31, 2022, which claims priority to Korean Patent Application No. 10-2022-0038231 filed on Mar. 28, 2022, in Korean Intellectual Property Office, the entire contents of which are hereby incorporated by reference in its entirety.

BACKGROUND

1. Field

The present invention relates to a data security technology, and more particularly, to a system and method for encrypting and decrypting data.

2. Description of Related Art

Recently, due to the development of communication and computing resources, various computing services have a great impact on us. However, the computing services that transmit and receive data using a network have many security problems.

In particular, due to the development of networks, necessary data may be transmitted and received anytime and anywhere, and reading, writing, and modifying data is becoming increasingly free. Conversely, this means that information may always be exposed to someone else through the networks.

In general, for important data, it is sufficient to encrypt the entire contents. However, when encrypting the entire contents, there is a problem that a very large amount of overhead is required to encrypt and decrypt data. In addition, in order to encrypt and decrypt data, keys should be exchanged with each other, but data may be forged or falsified by maliciously stealing the keys on the way. Various key management methods may be used to improve these security vulnerabilities, but have the problem that they increase management overhead and cannot completely solve the risk of key leakage.

SUMMARY

The present invention provides a system and method for encrypting and decrypting data at a transmitting end and a receiving end.

However, the problems to be solved by the present invention are not limited to the problems described above, and other problems may be present.

According to a first aspect of the present invention, a method of encrypting data at a transmitting end includes: dividing transmission target data into an arbitrary number of blocks; selecting an encryption key generation target block to be used for extracting an encryption key from among the plurality of divided blocks; generating an encryption key based on the encryption key generation target block; selecting an encryption target block from among remaining blocks excluding the encryption key generation target block; and encrypting the encryption target block based on the generated encryption key.

According to a second aspect of the present invention, method of decrypting data at a receiving end includes:

receiving reception target data transmitted from a transmitting end; dividing the receiving target data into a plurality of blocks according to encryption protocol information previously shared with the transmitting end; selecting a decryption key generation target block to be used for extracting a decryption key from among the plurality of divided blocks based on the encryption protocol information; generating a decryption key based on the decryption key generation target block; and decrypting remaining blocks excluding the decryption key generation target block based on the generated decryption key to restore the reception target data.

A computer program according to another aspect of the present invention for solving the above problems is combined with a computer as hardware to execute method of encrypting and decrypting data and is stored in a computer-readable recording medium.

Other specific details of the invention are included in the detailed description and drawings.

BRIEF DESCRIPTION OF DRAWINGS

FIG. 1 is an exemplary diagram for describing a configuration of a computer system in which a method of encrypting and decrypting data is implemented according to an embodiment of the present invention.

DETAILED DESCRIPTION

Figure 2:
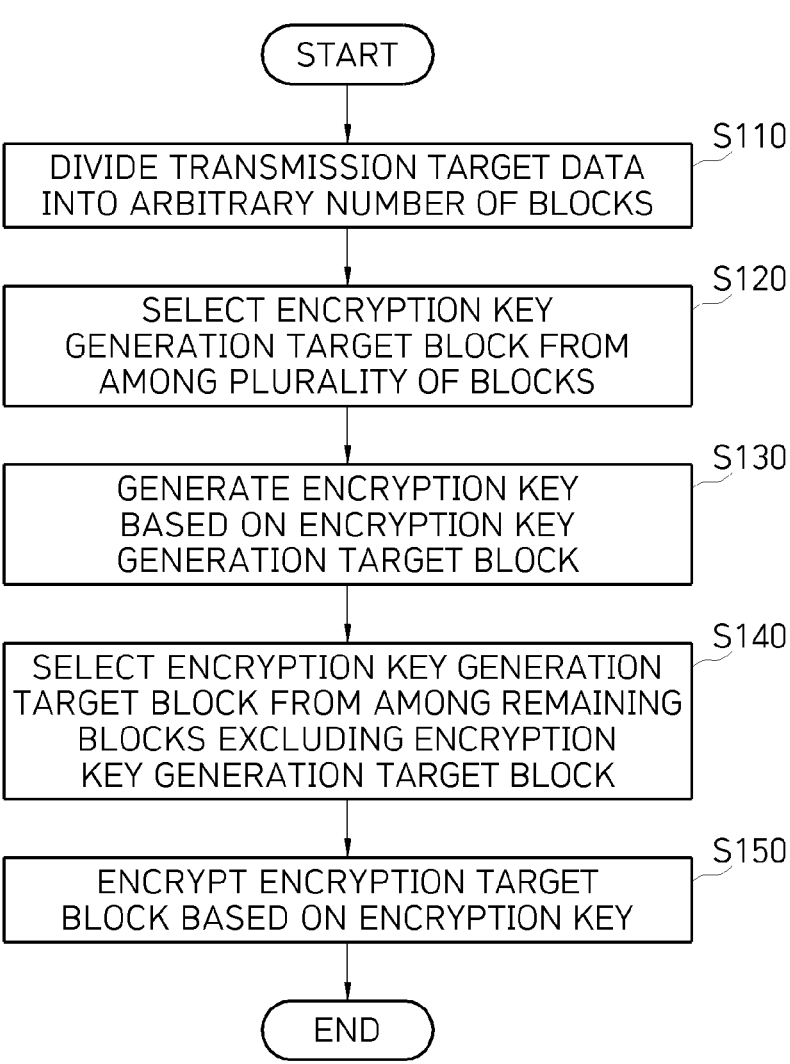
FIG. 2 is a flowchart of a method of encrypting data at a transmitting end according to an embodiment of the present invention.

Various advantages and features of the present invention and methods accomplishing them will become apparent from the following description of embodiments with reference to the accompanying drawings. However, the present invention is not limited to embodiments to be described below, but may be implemented in various different forms, these embodiments will be provided only in order to make the present invention complete and allow those skilled in the art to completely recognize the scope of the present invention, and the present invention will be defined by the scope of the claims.

Terms used in the present specification are for explaining embodiments rather than limiting the present invention. Unless otherwise stated, a singular form includes a plural form in the present specification. Throughout this specification, the term "comprise" and/or "comprising" will be understood to imply the inclusion of stated constituents but not the exclusion of any other constituents. Like reference numerals refer to like components throughout the specification and "and/or" includes each of the components mentioned and includes all combinations thereof. Although "first," "second," and the like are used to describe various components, it goes without saying that these components are not limited by these terms. These terms are used only to distinguish one component from other components. Therefore, it goes without saying that the first component mentioned below may be the second component within the technical scope of the present invention.

Unless defined otherwise, all terms (including technical and scientific terms) used in the present specification have the same meanings commonly understood by those skilled in the art to which the present invention pertains. In addition, terms defined in commonly used dictionary are not ideally or excessively interpreted unless explicitly defined otherwise.

Figure 1:
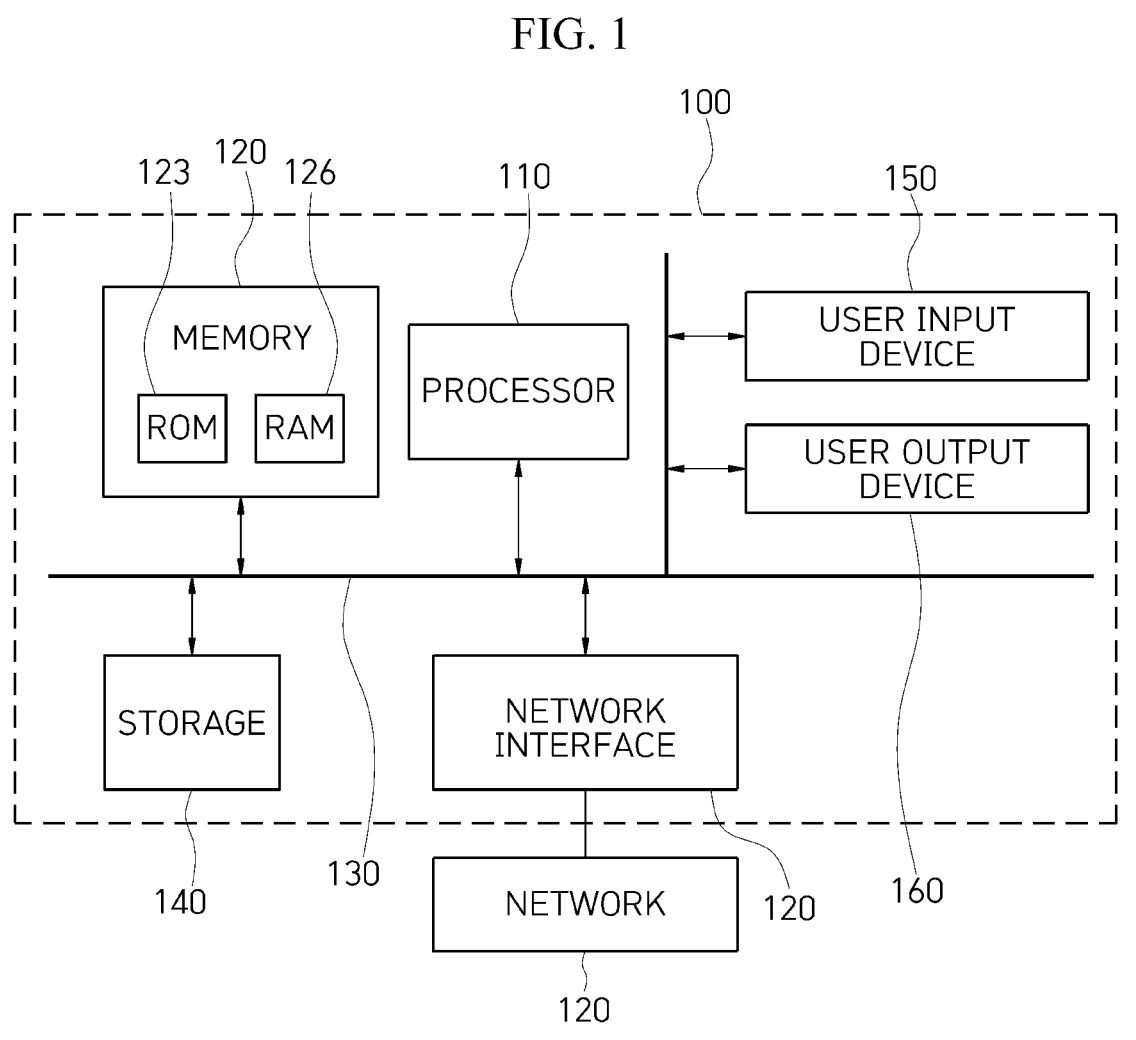

FIG. 1 is an exemplary diagram for describing a configuration of a computer system 100 in which a method of encrypting and decrypting data is implemented according to an embodiment of the present invention. Meanwhile, the method of encrypting and decrypting data according to an embodiment of the present invention may be implemented in the computer system 100 or recorded on a recording medium.

As illustrated in FIG. 1, the computer system 100 may include at least one processor 110, a memory 120, a data communication bus 130, a storage 140, a user input device 150, and a user output device 160. Each of the above-described components performs data communication through the data communication bus 130.

The computer system 100 may further include a network interface 170 connected to a network 180. The processor 110 may be a central processing unit (CPU) or a semiconductor device that processes instructions stored in the memory 120 and/or storage 140.

The memory 120 and the storage 140 may include various types of volatile or non-volatile storage media. For example, the memory 120 may include a ROM 123 and a RAM 126.

Therefore, the method of encrypting and decrypting data according to an embodiment of the present invention may be implemented in a method executable on a computer. When the method of encrypting and decrypting data according to an embodiment of the present invention is performed by a computer device, computer-readable instructions may perform the operating method according to the present invention.

Meanwhile, the method of encrypting and decrypting data according to the present invention described above can be implemented as a computer-readable code on a computer-readable recording medium. The computer-readable recording medium may include all kinds of recording media in which data that may be read by a computer system are stored. For example, there may be the ROM, the RAM, a magnetic tape, a magnetic disk, a flash memory, an optical data storage device, and the like. In addition, the computer-readable recording medium may be distributed in the computer system 100 connected through a computer communication network, and stored and executed as readable codes in a distributed manner. The computer system 100 that performs the method of encrypting and decrypting data according to an embodiment of the present invention supplies an encoder that performs encryption of data and a decoder that performs decryption of data. That is, the computer system 100 provides an encoder API to a transmitting target terminal (hereinafter, referred to as a transmitting end) that wishes to encrypt data, and provides a decoder API to a receiving target terminal (hereinafter, referred to as a receiving end) that wishes to decrypt data encrypted by the encoder.

For example, the transmitting end and the receiving end may be various devices such as smartphones, cameras, black boxes, tablet PCs, or laptops, and may be applied to secure data of the corresponding digital devices. In addition, transmission/reception target data in the present invention may include at least one of text messages, still image data, video data, personal information data, and voice data. In other words, one data may be data for adding security within a server or terminal. In the description of the present invention, an example in which the transmission/reception target data is the video data composed of a plurality of frames will be described.

One embodiment of the present invention is characterized in that the receiving end shares encryption protocol information generated by the transmitting end with each other. According to this technical feature, it is characterized in that the transmitting end and the receiving end exchange an encryption key and a decryption key, that is, a symmetric key with each other.

In this way, one embodiment of the present invention does not transmit or share the key when transmitting data, thereby solving the security problem of data leakage due to a key being stolen by a third party on the way.

Meanwhile, in one embodiment of the present invention, the encoder is provided at the transmitting end and the decoder is provided at the receiving end. Input parameters of the encoder are transmission target data, and output data is encrypted transmission target data. Input parameters of the decoder are encrypted transmission target data (this will be referred to as reception target data), and output data is decrypted reception target data.

Hereinafter, the method of encrypting data at a transmitting end performed by the computer system 100 according to an embodiment of the present invention will be described in more detail with reference to FIGS. 2 to 4.

FIG. 2 is a flowchart of a method of encrypting data at a transmitting end according to an embodiment of the present invention. FIG. 3 is a diagram illustrating an example of encrypting the transmission target data at the transmitting end according to an embodiment of the present invention.

First, the transmitting end divides the transmission target data into an arbitrary number of blocks (S110). In one embodiment, the transmitting end may divide the transmission target data into a plurality of blocks according to at least one of an arbitrary number and an arbitrary size. In this case, the transmission target data may be at least one data, and the plurality of data means a plurality of consecutive data. In the case of the plurality of data, each of the plurality of data is divided into an arbitrary number of blocks.

For example, video data is composed of the plurality of transmission target data, and one transmission target data means one frame data that constitutes video data. In this case, the transmitting end may divide one frame data of 1,000 bytes in size into three blocks. According to the embodiment, all three blocks may be divided to have the same data size, and may be divided into 100 bytes, 400 bytes, or 500 bytes depending on the arbitrary size.

Figure 3:
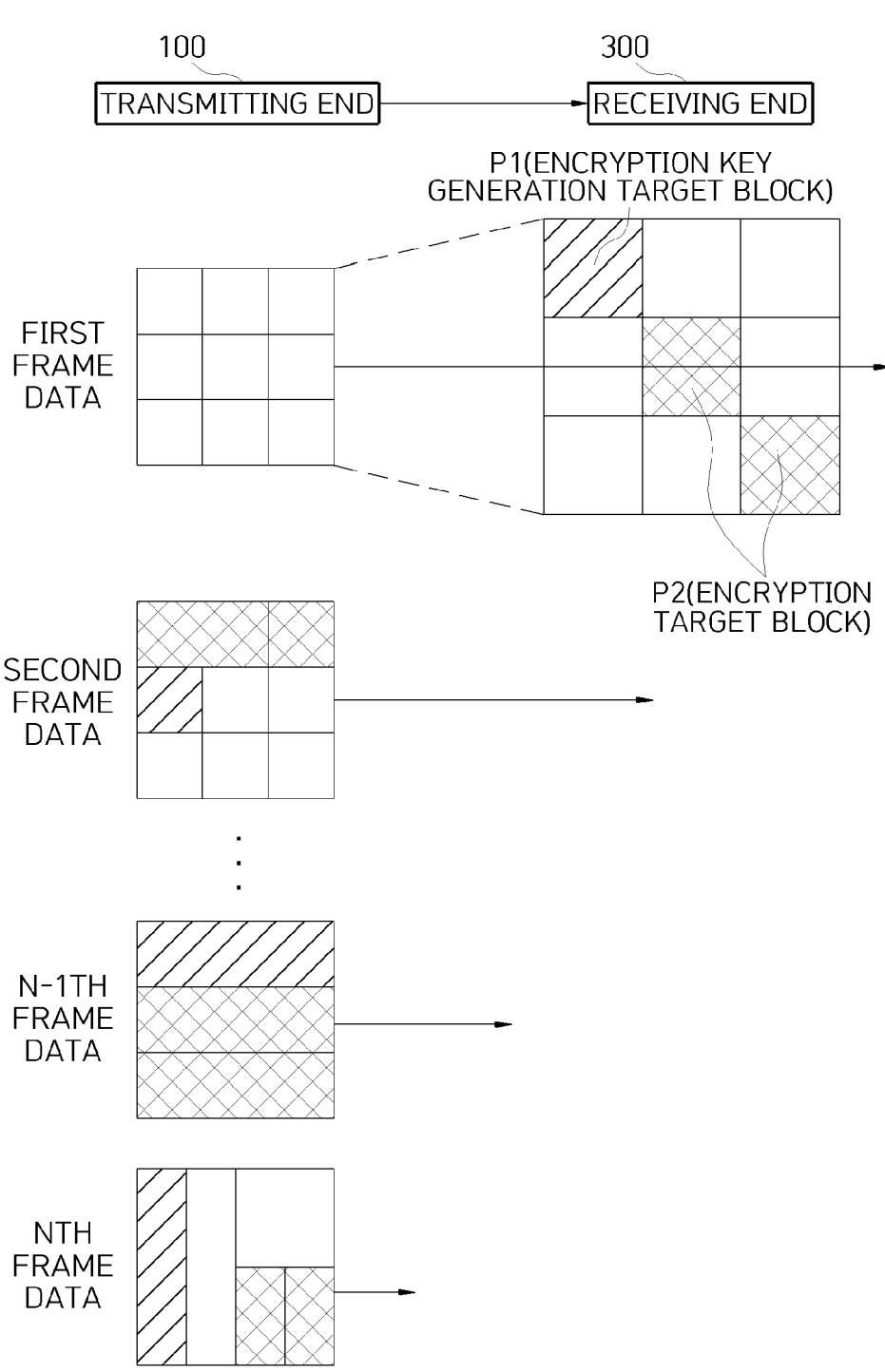
FIG. 3 is a diagram illustrating an example of encrypting transmission target data at the transmitting end according to an embodiment of the present invention.

In the example of FIG. 3, first frame data is divided into 9 blocks having the same size as each other, and nth frame data is divided into 5 blocks having different data sizes. In one embodiment of the present invention, blocks may be divided in the same way for a plurality of transmission target data, or blocks of at least one transmission target data may be divided in a different way from other transmission target data, as illustrated in FIG. 3.

Next, the transmitting end selects an encryption key generation target block to be used for extracting an encryption key from among the plurality of divided blocks (S120).

In one embodiment, the transmitting end may select any one of the plurality of blocks as the encryption key generation target block. For example, when one frame data is divided into three blocks, a second block (400 bytes of data) of the three blocks may be selected as the encryption key generation target block.

In another embodiment, the transmitting end may select a plurality of blocks among the plurality of blocks as the encryption key generation target block. For example, when one frame data is divided into three blocks, a first block and a third block (total 600 bytes of data) of the three blocks may be selected as the encryption key generation target block.

As such, according to the embodiment of the present invention, the encryption key generation target block may not be selected by a fixed method that satisfies specific conditions, but may be selected by various conditions and methods to further increase diversity and complexity in generating the encryption key, thereby increasing security.

In the example of FIG. 3, in the first frame data divided into 9 blocks, a first block P1 located at the top left is selected as the encryption key generation target block.

Next, the transmitting end generates an encryption key based on the selected encryption key generation target block (S130). In this case, an embodiment of the present invention may generate the encryption key according to various embodiments.

In one embodiment, the transmitting end may generate an encryption key for a data area corresponding to a predetermined location and a predetermined size of the encryption key generation target block. For example, the transmitting end may generate 32 bytes corresponding to a first location in the second block (400 bytes of data), which is the encryption key generation target block, as the encryption key.

In another embodiment, the transmitting end may extract hash values from the data area corresponding to the encryption key generation target block and generate the extracted hash values as the encryption key. In this case, the transmitting end may extract the hash value to have a preset data size from the data area corresponding to a decryption key generation target block. For example, the transmitting end may generate 32 bytes corresponding to a first location in the second block (400 bytes of data), which is the encryption key generation target block, as the encryption key. In addition, in order to strengthen security when generating the hash value, the hash value may be extracted from expanded data in which specific data is added to the data area corresponding to the encryption key generation target block.

In another embodiment, the transmitting end may extract the hash value to have a preset first data size from the data area corresponding to the encryption key generation target block, and extract only a preset second data size from among the extracted hash value to be generated as the encryption key. For example, the transmitting end may extract the hash value in the second block (400 bytes of data), which is the encryption key generation target block, as 32 bytes, and extract the hash value to satisfy the second data size according to an odd or even number or an arbitrary number of the extracted hash values and use the extracted hast value as the encryption key.

Next, the transmitting end selects an encryption target block from among the remaining blocks excluding the encryption key generation target block (S140).

In one embodiment, the transmitting end may select all the remaining blocks, excluding the encryption key generation target block, as the encryption target blocks from among the plurality of blocks. For example, the transmitting end may select all the remaining blocks, the first and third blocks, excluding the second block (400 bytes of data), which is the encryption key generation target block, as the encryption target blocks.

In another embodiment, the transmitting end may select some of the remaining blocks, excluding the encryption key generation target block, as the encryption target block from among the plurality of blocks. For example, the transmitting end may select only the third block of all the remaining blocks, excluding the second block (400 bytes of data), which is the encryption key generation target block, as the encryption target block.

In the example of FIG. 3, it is shown that in the first frame data divided into 9 blocks, the remainder excluding the encryption key generation target block, which is the first block P1 located at the top left, becomes the remaining blocks, and among the remaining blocks, the block located in the center and two blocks P2 located at the bottom right are selected as the encryption target block.

Next, the transmitting end encrypts the encryption target block based on the generated encryption key (S150). In the above-described example, the transmitting end does not perform encryption on the second block (400 bytes of data) selected as the encryption key generation target block, and performs encryption only on the block selected as the encryption target block among the remaining blocks. In the continuing example, if both the first block (100 bytes) and the third block (500 bytes) are selected as the encryption target blocks, the transmitting end encrypts the corresponding blocks. Alternatively, when only the third block is selected as the encryption target block, the transmitting end does not encrypt the first block, but encrypts only the third block.

As such, when the encryption of the transmission target data is completed, the transmitting end transmits the transmission target data to the receiving end.

Meanwhile, the security may be further strengthened by re-encrypting the encrypted result (encrypted transmission target data) one or more times in the same manner as in the above-described embodiment. When performing the re-encryption, it may be performed using the same process as the previous encryption process, or encryption may be performed in a different way. For example, when performing the re-encryption, in the case where the encryption key generation target block is set within the encryption target area of the previous encryption step, and the encryption target block is set to the key extraction target block (candidate block for encryption key generation) of the previous step, even parts that are not encrypted in the previous step may be encrypted, so the security level can be further increased by performing encryption on all data areas.

The security level may be increased in proportion to the number of times the re-encryption process is performed, and when the re-encryption is performed with different block settings at each step so that the entire data may be encrypted, the result that the entire block is encrypted may be acquired.

Figure 4:
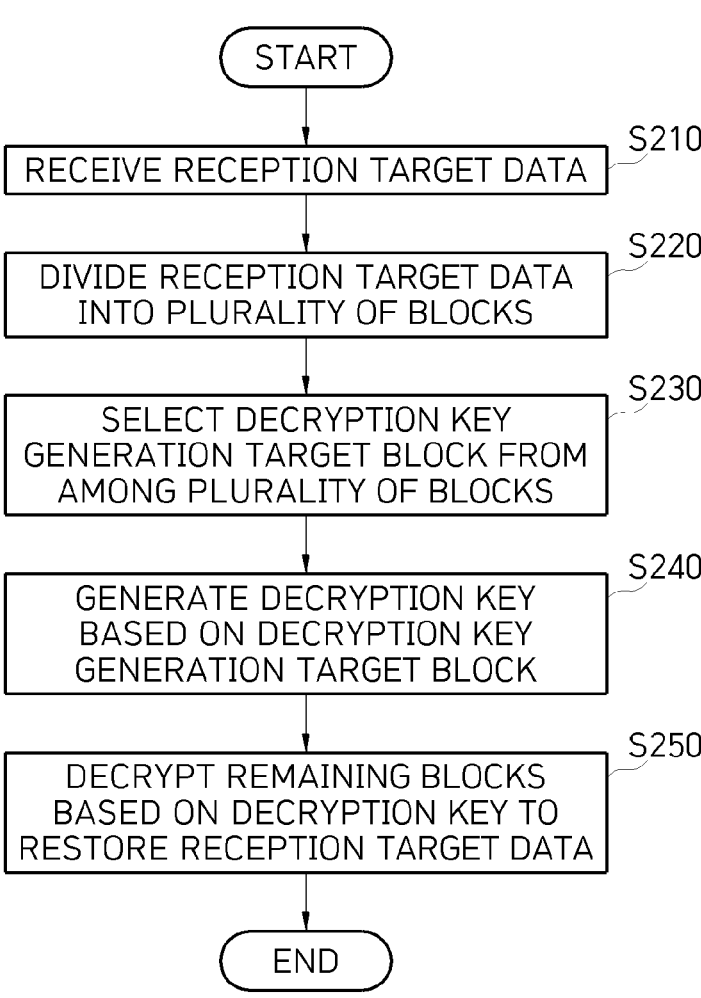
FIG. 4 is a flowchart of a method of decrypting data at a receiving end according to an embodiment of the present invention.

FIG. 4 is a flowchart of a method of decrypting data at a receiving end according to an embodiment of the present invention.

The receiving end extracts the decryption key is extracted in the same way as the transmitting end, and decrypts the encrypted block using the decryption key to restore the data transmitted from the transmitting end. Hereinafter, in describing the method of decrypting data at a receiving end, transmission target data transmitted from the transmitting end will be referred to as reception target data from the viewpoint of the receiving end. In addition, the encryption target block is referred to as the decryption target block, and the block corresponding to the encryption key generation target block is referred to as the decryption key generation target block. First, when the receiving end receives the reception target data transmitted from the transmitting end (S210), the reception target data is divided into a plurality of blocks according to the encryption protocol information already shared with the transmitting end (S220).

In this case, the method of encrypting and decrypting data according to the present invention is performed by the computer system 100 described in FIG. 1, and the computer system 100 provides APIs for encoding and decoding to the transmitting end and the receiving end, respectively. Accordingly, the encryption protocol information, including block division information for encrypting each transmission target data, information on the encryption key generation target block, and information on the encryption target block at the transmitting end, is shared with the receiving end. Accordingly, the receiving end may accurately identify the number, shape, and size information of divided blocks for each of the plurality of transmission target data at the transmitting end, the location of the encryption key generation target block, and the location of the encryption target block, even in the reception target data.

As such, one embodiment of the present invention allows the transmitting and receiving ends to share only the encryption protocol information operated by the same system 100, rather than sharing the symmetric key, thereby preventing problems such as key leakage during the transmission and reception of data.

Next, the receiving end selects the decryption key generation target block to be used for extracting the decryption key from among the plurality of blocks divided based on the encryption protocol information (S230), and generates the decryption key based on the decryption key generation target block (S240).

In one embodiment, the receiving end may generate a decryption key for a data area corresponding to a predetermined location and a predetermined size of the decryption key generation target block.

In another embodiment, the receiving end may extract hash values to have a preset data size from the data area corresponding to the encryption key generation target block and generate the extracted hash values as the decryption key.

In another embodiment, the receiving end may extract the hash values to have a preset first data size from the data area corresponding to the decryption key generation target block, and extract only a preset second data size from among the extracted hash values to be generated as the decryption key.

Meanwhile, the step of generating the decryption key at the receiving end is performed in the same manner as the process of generating the encryption key at the transmitting end described in FIGS. 2 and 3, and therefore, detailed descriptions and examples thereof will be omitted.

Next, the receiving end restores the reception target data by decrypting the remaining blocks excluding the decryption key generation target block based on the generated decryption key (S250).

In this case, the receiving end selects all or some of the remaining blocks as the decryption target block according to the encryption protocol information, and decrypts only the selected decryption target block to restore the reception target data.

Meanwhile, when the entire block of the reception target data is re-encrypted one or more times according to the re-encryption process described in FIGS. 2 and 3, the corresponding decoding is also required even in the decryption process. In this case, the embodiment of the present invention may acquire a first decryption key based on the decryption key generation target block corresponding to the re-encryption according to the encryption protocol information and performs the decryption on the remaining blocks excluding the decryption key generation target block. This process corresponds to the decryption process corresponding to the re-encryption.

Thereafter, a second decryption key is obtained according to the encryption protocol information, and the decryption is performed on the remaining blocks excluding the decryption key generation target block based on the second decryption key. When the re-encryption is performed multiple times, third and fourth decryption key generation processes and decryption processes may be performed. According to this process, the embodiment of the present invention restores the reception target data in which the entire block is encrypted.

Hereinafter, the method of verifying data forgery and falsification performed at the transmitting end and receiving end of the above-described computer system 100 will be described with reference to FIGS. 5 to 7.

Figure 5:
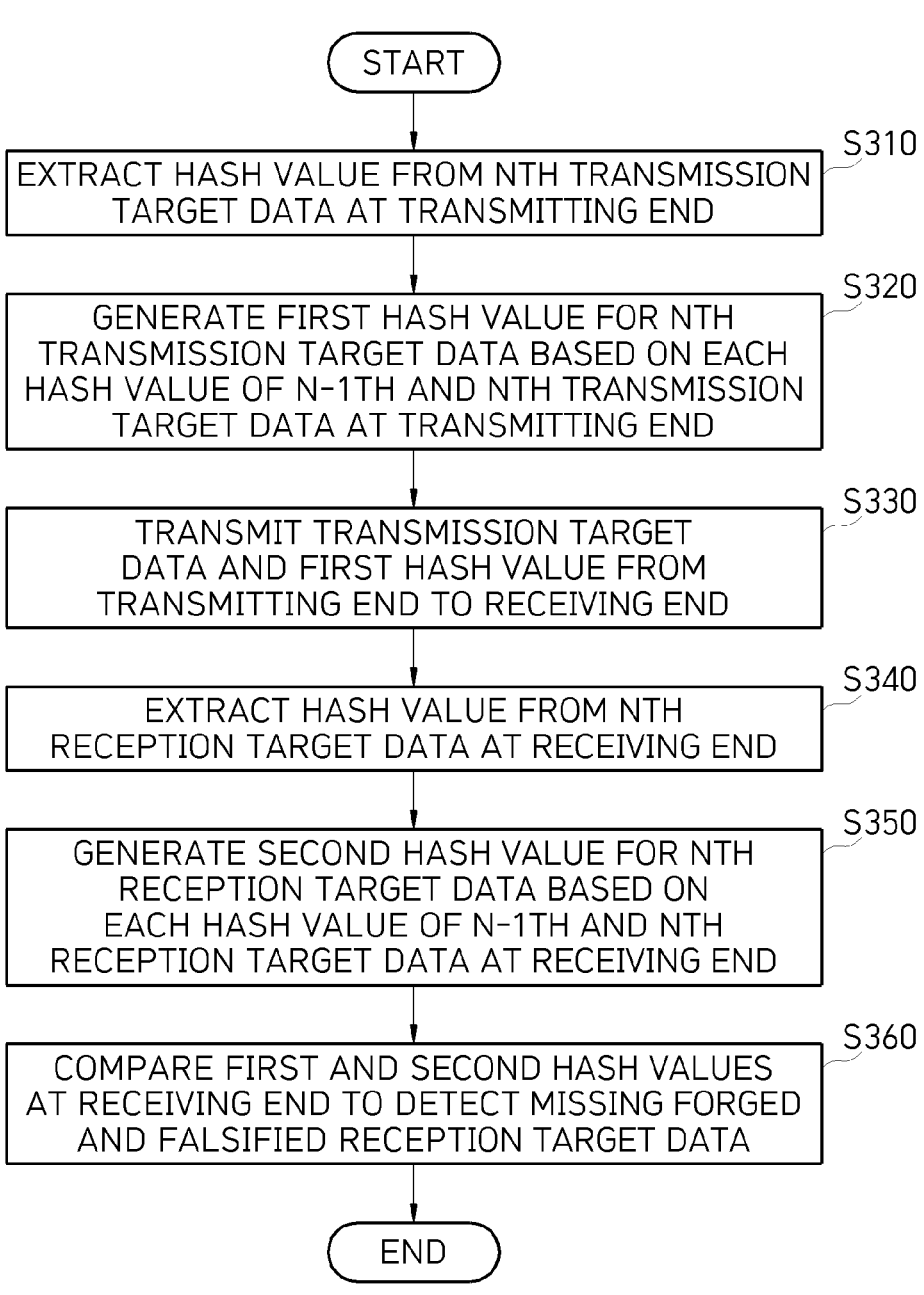
FIG. 5 is a flowchart of a method of verifying data forgery and falsification according to an embodiment of the present invention.

FIG. 5 is a flowchart of a method of verifying data forgery and falsification according to an embodiment of the present invention.

First, the transmitting end extracts the hash value from nth transmission target data (S310). Here, the nth transmission target data refers to data to be currently transmitted. In this case, when the nth transmission target data is first transmission target data, since there is no previous data, the transmitting end applies any preset promised data as the hash value corresponding to n−1th transmission target data.

Next, the transmitting end generates a first hash value which is a final hash value for the nth transmission target data based on a hash value of n−1th transmission target data and a hash value of the nth transmission target data (S320).

Next, the transmitting end transmits the transmission target data and the first hash value corresponding to each transmission target data to the receiving end (S330).

Next, the receiving end extracts a hash value from nth reception target data (S340). Here, the nth reception target data is the same as the nth transmission target data and refers to data currently received by the receiving end.

Next, the receiving end generates a second hash value which is a final hash value for the nth reception target data based on a hash value of n−1th reception target data and a hash value of the nth reception target data (S350).

Thereafter, the receiving end compares the first hash value transmitted from the transmitting end and the second hash value that the receiving end generates to detect missing forged and falsified reception target data among the plurality of reception target data (S360).

Figure 6:
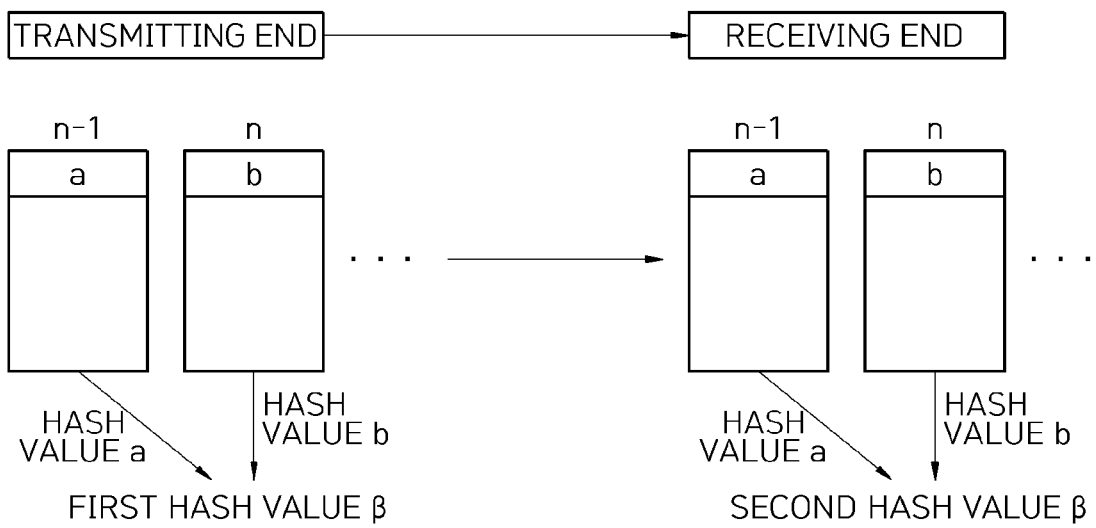
FIG. 6 is a diagram for describing an example of a method of preventing data forgery and falsification.

FIG. 6 is a diagram for describing an example of a method of preventing data forgery and falsification.

First, the transmitting end extracts a hash value b of the nth transmission target data, and generates a new final hash value β for the nth transmission target data based on a hash value a and a hash value b of the previously extracted n−1th transmission target data. In this case, the final hash value of the n−1th transmission target data generated in the previous step is α. The transmitting end transmits the first hash values (a, B, etc.), which is the final hash value, when transmitting each transmission target data to the receiving end.

Thereafter, when the receiving end receives the nth reception target data, it extracts the hash value b of the nth reception target data, and generates the new final hash value β for the nth reception target data based on the hash value a and hash value b of the previously extracted n−1th reception target data.

The receiving end may detect whether the forgery or falsification of data has occurred by confirming that the first hash value and the second hash value are the same as B.

Figure 7:
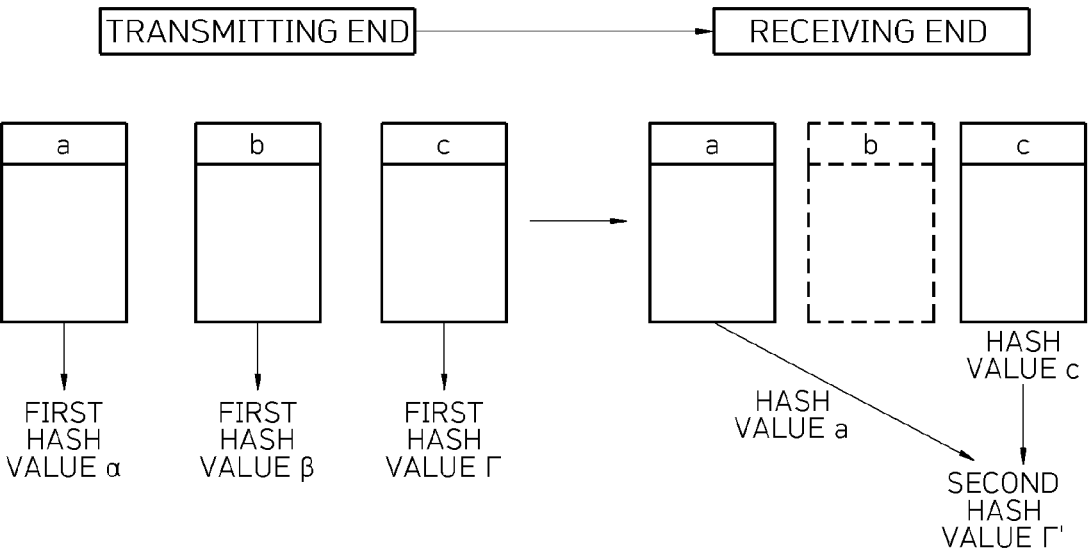
FIG. 7 is a diagram for describing an example of detecting forgery or falsification among transmission/reception target data.

FIG. 7 is a diagram for describing an example of detecting the forgery or falsification alteration among transmission/reception target data.

In the case of the conventional method of preventing data forgery and falsification, the forgery and falsification are detected by comparing the hash values of each transmission/reception target data. In other words, the hash values of the n−1th transmission target data and the n−1th reception target data are the same as a, and therefore, confirming that there is no forgery or falsification in the data. Likewise, the hash values of the nth transmission target data and the nth reception target data are the same as b, confirming that there is no forgery or falsification in the data. In this case, when forgery and falsification occurs, such as missing or stolen intermediate data among the plurality of transmitted and received data, the conventional method of preventing forgery and falsification cannot detect the forgery and falsification.

To solve this problem, the embodiment of the present invention may detect whether intermediate data has been forged or falsified in consideration of the correlation of the hash values in each transmission/reception target data.

In the example of FIG. 7, the transmitting end transmits three consecutive transmission target data and the first hash values α, β, and γ to the receiving end. Among those, it is assumed that the nth transmission target data is forged and falsified and missing. The receiving end generates the second hash value a from the n−1th reception target data, but since there is no nth reception target data, the second hash value γ' is generated based on the hash value a of the n−1th reception target data and a hash value c of an n+1th reception target data.

As a result of comparing the first hash value y and the second hash value γ', since the hash values are different from each other, it may be detected that the nth reception target data, which is the previous data of the n+1th reception target data, is missing due to the forgery and falsification.

Meanwhile, in the above description, steps S110 to S360 may be further divided into additional operations or combined into fewer operations according to an embodiment of the present invention. Also, some steps may be omitted if necessary, and an order between the steps may be changed. In addition, the contents of FIGS. 2 and 7 may be applied to the computer system 100 of FIG. 1 even if other contents are omitted.

The above-described embodiment of the present invention may be embodied as a program (or application) and stored in a medium for execution in combination with a computer which is hardware.

In order for the computer to read the program and execute the methods implemented as the program, the program may include a code coded in a computer language such as C, C++, JAVA, Ruby, Python, or machine language that the processor (CPU) of the computer may read through a device interface of the computer. Such code may include functional code related to a function or such defining functions necessary for executing the methods and include an execution procedure related control code necessary for the processor of the computer to execute the functions according to a predetermined procedure. In addition, the code may further include a memory reference related code for which location (address street number) in an internal or external memory of the computer the additional information or media necessary for the processor of the computer to execute the functions is to be referenced at. In addition, when the processor of the computer needs to communicate with any other computers, servers, or the like located remotely in order to execute the above functions, the code may further include a communication-related code for how to communicate with any other computers, servers, or the like using the communication module of the computer, what information or media to transmit/receive during communication, and the like.

The storage medium is not a medium that stores images therein for a while, such as a register, a cache, a memory, or the like, but means a medium that semi-permanently stores the images therein and is readable by an apparatus. Specifically, examples of the storage medium include, but are not limited to, ROM, random-access memory (RAM), CD-ROM, a magnetic tape, a floppy disk, an optical image storage device, and the like. That is, the program may be stored in various recording media on various servers accessible by the computer or in various recording media on the computer of the user. In addition, the media may be distributed in the computer system 100 connected by a network, and a computer-readable code may be stored in a distributed manner.

According to an embodiment of the present invention described above, by omitting a process of transmitting and sharing a key in a process of encrypting and decrypting transmission/reception target data, it is possible to prevent malicious data theft by a third party, thereby further improving data security.

In addition, by generating and comparing hash values based on a continuous correlation of transmission/reception target data, it is possible to detect forgery and falsification in which specific data is omitted or removed from continuous data.

The effects of the present invention are not limited to the above-described effects, and other effects that are not mentioned may be obviously understood by those skilled in the art from the following description.

The above description of the present invention is for illustrative purposes, and those skilled in the art to which the present invention pertains will understand that it may be easily modified to other specific forms without changing the technical spirit or essential features of the present invention. Therefore, it should be understood that the above-mentioned embodiments are exemplary in all aspects but are not limited thereto. For example, each component described as a single type may be implemented in a distributed manner, and similarly, components described as distributed may be implemented in a combined form.

It is to be understood that the scope of the present invention will be defined by the claims rather than the above-described description and all modifications and alternations derived from the claims and their equivalents are included in the scope of the present invention.

The invention claimed is:

1. A system of encrypting data at a transmitting end, the system comprising:
 a memory storing instructions that when executed by at least one processor cause the system to:
 divide transmission target data into an arbitrary number of blocks;
 select an encryption key generation target block to be used for extracting an encryption key from among the plurality of divided blocks;

generate an encryption key based on the encryption key generation target block by extracting hash values from a data area corresponding to the encryption key generation target block and generating the extracted hash values as the encryption key, wherein the hash values are extracted to have a preset data size from the data area corresponding to the encryption key generation target block;

select an encryption target block from among remaining blocks excluding the encryption key generation target block; and encrypt the encryption target block based on the generated encryption key.

2. The system of claim 1, wherein the transmission target data is divided into a plurality of blocks according to at least one of an arbitrary number and an arbitrary size.

3. The system of claim 1, wherein any one or a plurality of blocks among the plurality of blocks are selected as the encryption key generation target block.

4. The system of claim 1, wherein the encryption key is generated for a data area corresponding to a predetermined location and a predetermined size of the encryption key generation target block.

5. The system of claim 1, wherein the hash values are extracted to have a preset first data size from the data area corresponding to the encryption key generation target block, and only a preset second data size is extracted from among the extracted hash values and generated as the encryption key.

6. The system of claim 1, wherein all or some of the remaining blocks excluding the encryption key generation target block among the plurality of blocks are selected as the encryption target block.

7. The system of claim 1, wherein the memory further comprises instructions that when executed by the processor cause the system to:

re-encrypt the encrypted transmission target data one or more times, by:

dividing the encrypted transmission target data into a new arbitrary number of blocks;

selecting the encryption key generation target block to be used for extracting the encryption key from among the plurality of divided blocks;

generating the encryption key based on the encryption key generation target block;

selecting the encryption target block from among remaining blocks excluding the encryption key generation target block; and encrypting the encryption target block based on the generated encryption key.

8. The system of claim 1, wherein the memory further comprises instructions that when executed by the processor cause the system to:

extract a hash value from nth transmission target data;

generate a first hash value which is a final hash value for the nth transmission target data based on a hash value of n−1th transmission target data and a hash value of the nth transmission target data; and transmit the plurality of transmission target data and the first hash value corresponding to each transmission target data to a receiving end, wherein the receiving end generates a second hash value from the hash values of the nth and n−1th reception target data corresponding to the transmission target data, and compares the first and second hash values to detect missing forged and falsified transmission target data among the plurality of transmission target data.

9. The system of claim 8, wherein when the nth transmission target data is an initial transmission target data, preset data is applied as the hash value corresponding to the n−1th transmission target data.

10. A system of decrypting data at a receiving end, the system comprising:

a memory storing instructions that when executed by at least one processor cause the system to:

receive reception target data transmitted from a transmitting end;

divide the receiving target data into a plurality of blocks according to encryption protocol information previously shared with the transmitting end;

select a decryption key generation target block to be used for extracting a decryption key from among the plurality of divided blocks based on the encryption protocol information;

generate a decryption key based on the decryption key generation target block by extracting hash values to have a preset data size from a data area corresponding to the decryption key generation target block and generating the extracted hash values as the decryption key; and decrypt remaining blocks excluding the decryption key generation target block based on the generated decryption key to restore the reception target data.

11. The system of claim 10, wherein an encryption key is generated for the reception target data based on an encryption key generation target block selected from among the blocks divided into the plurality of blocks according to the encryption protocol information shared by the transmitting end, and at least one of the remaining blocks excluding the encryption key generation target block is selected as an encryption target block and encrypted.

12. The system of claim 11, wherein the decryption key is generated for a data area corresponding to a predetermined location and a predetermined size of the decryption key generation target block.

13. The system of claim 10, wherein the hash values are extracted to have a preset first data size from a data area corresponding to the decryption key generation target block, and only a preset second data size is extracted from among the extracted hash values and generated as the decryption key.

14. The system of claim 10, wherein the memory further comprises instructions that when executed by the processor cause the system to:

extract hash values from nth reception target data;

generate a first hash value which is a final hash value for nth reception target data based on a hash value of n−1th reception target data and a hash value of the nth reception target data; and compare the first hash value and the second hash value transmitted from the transmitting end to detect missing forged and falsified reception target data among a plurality of reception target data, wherein the transmitting end generates the first hash value from the hash values of the nth and n−1th transmission target data corresponding to the reception target data and transmits the generated first has value to the receiving end.

15. The system of claim 14, wherein when the nth reception target data is an initial reception target data, at the transmitting end, preset data is applied as the hash value corresponding to the n−1th transmission target data.

* * * * *